United States Patent
Funae

(10) Patent No.: US 9,041,599 B2
(45) Date of Patent: May 26, 2015

(54) RADAR RECEIVER, AND RADAR DEVICE EQUIPPED WITH SAME

(71) Applicant: FURUNO Electric Company Limited, Nishinomiya, Hyogo (JP)

(72) Inventor: Akio Funae, Nishinomiya (JP)

(73) Assignee: FURUNO ELECTRIC COMPANY LIMITED, Hyogo (JP)

( * ) Notice: Subject to any disclaimer, the term of this patent is extended or adjusted under 35 U.S.C. 154(b) by 236 days.

(21) Appl. No.: 13/922,534

(22) Filed: Jun. 20, 2013

(65) Prior Publication Data

US 2014/0002298 A1 Jan. 2, 2014

(30) Foreign Application Priority Data

Jun. 29, 2012 (JP) .................................. 2012-147297

(51) Int. Cl.
*G01S 7/03* (2006.01)
*G01S 7/285* (2006.01)
*G01S 5/02* (2010.01)

(52) U.S. Cl.
CPC . *G01S 7/03* (2013.01); *G01S 7/038* (2013.01); *G01S 5/0215* (2013.01); *G01S 7/285* (2013.01)

(58) Field of Classification Search
CPC ......... G01S 5/0215; G01S 7/023; G01S 7/03; G01S 7/032; G01S 7/038; G01S 7/282; G01S 7/285; G01S 7/352; H01Q 1/525
USPC ................................................ 342/175, 198
See application file for complete search history.

(56) References Cited

U.S. PATENT DOCUMENTS

| | | | | |
|---|---|---|---|---|
| 4,190,838 A | * | 2/1980 | Kemp | 342/20 |
| 4,347,515 A | * | 8/1982 | Hoover, Jr. | 342/351 |
| 4,725,842 A | * | 2/1988 | Mayberry | 342/198 |
| 4,935,744 A | * | 6/1990 | Anflo et al. | 342/201 |
| 4,968,967 A | * | 11/1990 | Stove | 342/165 |
| 4,970,519 A | * | 11/1990 | Minnis et al. | 342/165 |
| 5,461,383 A | * | 10/1995 | Ono et al. | 342/20 |
| 5,940,025 A | * | 8/1999 | Koehnke et al. | 342/159 |
| 6,037,895 A | * | 3/2000 | Uehara | 342/70 |
| 6,720,912 B2 | * | 4/2004 | Shono | 342/198 |
| 7,002,511 B1 | * | 2/2006 | Ammar et al. | 342/134 |
| 7,158,074 B2 | * | 1/2007 | Nakamura et al. | 342/70 |
| 7,202,812 B2 | * | 4/2007 | Krikorian et al. | 342/198 |

(Continued)

FOREIGN PATENT DOCUMENTS

| | | |
|---|---|---|
| JP | 60-197007 A | 10/1985 |
| JP | 5-2871 Y2 | 1/1993 |

(Continued)

*Primary Examiner* — Peter Bythrow
(74) *Attorney, Agent, or Firm* — Global IP Counselors, LLP

(57) ABSTRACT

There is provided a radar receiver that effectively prevents local oscillator signals from leaking out from an antenna. A receiver 21 includes a local oscillator 5, a mixer 6, a buffer amplifier 11, and a mode switcher 16. The local oscillator 5 outputs a local oscillation signal LO. The mixer 6 mixes a high-frequency signal RF received by a radar antenna 2 with the local oscillation signal LO. The buffer amplifier 11 is disposed between the local oscillator 5 and the mixer 6. The mode switcher 16 switches at least between a standby mode in which power is supplied to the local oscillator 5 and no power is supplied to the buffer amplifier 11 and a reception mode in which power is supplied to both the local oscillator 5 and the buffer amplifier 11.

5 Claims, 3 Drawing Sheets

(56) References Cited

U.S. PATENT DOCUMENTS

| | | | |
|---|---|---|---|
| 7,221,311 B2 * | 5/2007 | Kashiwa et al. | 342/193 |
| 7,286,080 B2 * | 10/2007 | Sakamoto et al. | 342/175 |
| 7,388,537 B2 * | 6/2008 | Martinson et al. | 342/20 |
| 7,450,058 B2 * | 11/2008 | Arayashiki et al. | 342/175 |
| 8,659,473 B2 * | 2/2014 | Bauwelinck et al. | 342/148 |
| 2007/0080854 A1 * | 4/2007 | Arayashiki et al. | 342/175 |
| 2008/0007444 A1 * | 1/2008 | Martinson et al. | 342/20 |

FOREIGN PATENT DOCUMENTS

| | | |
|---|---|---|
| JP | 2564074 B2 | 12/1996 |
| JP | 2005-337988 A | 12/2005 |

* cited by examiner

RADAR RECEIVER, AND RADAR DEVICE EQUIPPED WITH SAME

CROSS-REFERENCE TO RELATED APPLICATIONS

This application claims priority to Japanese Patent Application No. 2012-147297 filed on Jun. 29, 2012. The entire disclosure of Japanese Patent Application No. 2012-147297 is hereby incorporated herein by reference.

BACKGROUND

1. Field of the Invention

The present invention relates to a configuration for preventing signals of a local oscillator provided to the receiver of a radar device from leaking out from an antenna.

2. Background Information

A pulse radar device finds a target in the surrounding area by sending high-frequency pulse signals produced by a magnetron or other such oscillator out from an antenna, and using the antenna to receive and detect echoes (reflected waves) that come back from the target. The configuration of a conventional radar device is shown in FIG. 3.

As shown in FIG. 3, the receiver 10 of a conventional radar device 1 generally has a configuration in which a front end 3 is provided ahead of a detector 4. The front end 3 converts a high-frequency signal RF received by an antenna 2 down to an intermediate-frequency signal IF. This front end 3 includes a local oscillator 5 that outputs a local oscillation signal LO, and a mixer 6 that mixes the local oscillation signal LO with the received high-frequency signal RF. A receiver including a front end such as this is discussed in Japanese Patent No. 2564074 (Patent Literature 1), Japanese Patent Application Publication No. 2005-337988 (Patent Literature 2), Japanese Patent Application Publication No. S60-197007 (Patent Literature 3), and Japanese Utility Model Application Publication No. H5-2871 (Patent Literature 4), for example.

However, because the magnetron 19 or the local oscillator 5 may become unstable due to temperature changes, they have to be preheated by turning on the power ahead of time, before the transmission and reception of signals. In view of this, a conventional radar device has a mode in which current only flows to the magnetron 19 or the local oscillator 5, and no signals are transmitted or received (hereinafter referred to as a standby mode).

The standby mode has two main roles. The first is to perform preheating by sending current to the magnetron 19 or the local oscillator 5 when the power to the radar device 1 is switched on. Specifically, the magnetron 19 or the local oscillator 5 can be preheated by switching to the standby mode immediately after turning on the power to the radar device 1. Transmission and reception can be carried out properly by starting transmission and reception after first canceling the standby mode after sufficient preheating.

The second role of the standby mode is to continue sending power to the magnetron 19 or the local oscillator 5 while temporarily halting the transmission of pulse signals from the radar antenna 2. For example, if the user wants to halt the transmission and reception of the radar device 1 temporarily, such as when putting in to a harbor, if the supply of electrical power to the magnetron 19 or the local oscillator 5 should be interrupted here, then the preheating will have to be performed again when the transmission and reception are restarted. Therefore, if the system is put in the standby mode when transmission and reception are to be temporarily halted, the transmission and reception can be halted in a state in which power is still being sent to the magnetron 19 or the local oscillator 5. This prevents the magnetron 19 or the local oscillator 5 from becoming unstable due to temperature changes, so transmission and reception can be restarted instantly (without preheating) when necessary.

SUMMARY

With the conventional radar receiver 10 shown in FIG. 3, a local oscillation signal LO from the local oscillator 5 sometimes leaks out through the mixer 6 to the antenna 2 side, and is then emitted from the antenna 2. If the local oscillation signal LO is thus emitted from the antenna 2, there is the risk that it will jam other radar devices installed on the host vessel or other vessels as an interference image.

However, the local oscillation signal LO that leaks out from the antenna 2 is very weak compared to the pulse signal produced by the magnetron 19. Therefore, during normal transmission and reception by the radar device 1, any local oscillation signal LO that leaks out from the antenna 2 is buried in the pulse signal and not noticed. Because of the above situation, the leakage of local oscillation signals tended not to be a major problem, so almost nothing has been done about them.

However, since no transmission or reception of pulse signals is performed when the radar device 1 is in the standby mode, any local oscillation signal LO that leaks out from the antenna 2 is more readily noticed at such times. Also, even though the leaked local oscillation signal LO is weak, it will tend to jam the radar devices of other vessels in situations in which the distance to the other vessels is short, such as in port. Since the radar device 1 is most likely to be switched to the standby mode in port, the effect of local oscillation signals LO in the standby mode cannot be ignored, and something must be done about this leakage.

In view of this, one way to deal with leakage is to ensure isolation by inserting a PIN diode or other such attenuator ahead of the low noise amplifier 7 shown in FIG. 3, for example. However, this approach is not a solution to the root problem, and the leakage of local oscillation signals from the antenna cannot be completely prevented.

The present invention was conceived in light of the above situation, and it is an object thereof to provide a radar receiver with which the leakage of a local oscillation signal from an antenna is effectively prevented.

The problem to be solved by the present invention is as stated above, and the means for solving this problem, and the effects thereof, will now be described.

In an aspect of the present invention, a radar receiver with the following constitution is provided. Specifically, this radar receiver includes a local oscillator, a mixer, a buffer amplifier, and a mode switcher. The local oscillator outputs a local oscillation signal. The mixer mixes a high-frequency signal received by an antenna with the local oscillation signal. The buffer amplifier is disposed between the local oscillator and the mixer. The mode switcher switches at least between a standby mode in which power is supplied to the local oscillator and no power is supplied to the buffer amplifier and a reception mode in which power is supplied to both the local oscillator and the buffer amplifier.

Thus, the local oscillation signal can be effectively prevented from leaking out through the mixer in the standby mode by turning off the power to the buffer amplifier located between the local oscillator and the mixer. Also, since the power to the local oscillator is on even in this standby mode, the local oscillator can be prevented from becoming unstable due to temperature changes. Furthermore, the buffer amplifier is used to decrease the degree of connection between the mixer and the local oscillator, and is generally not affected much by temperature changes. Therefore, even when the power to the buffer amplifier is switched off, there is no danger that the buffer amplifier will become unstable.

The above-mentioned radar receiver is preferably configured so that it includes a low noise amplifier that amplifies the high-frequency signal received by the antenna, and outputs the result to the mixer. The mode switcher supplies power to the low noise amplifier in both the standby mode and the reception mode.

Since there is the risk that the low noise amplifier will become unstable due to temperature changes, the power is left on even in the standby mode. This prevents temperature changes in the low noise amplifier, so stable reception can be commenced right away at the stage when the standby mode is switched to the reception mode.

The above-mentioned radar receiver is preferably configured so that the mode switcher acquires a trigger signal outputted when an operation is performed to start transmission by a radar transmitter, and switches from the standby mode to the reception mode when the trigger signal has been acquired.

Thus, when the user performs an operation to commence transmission on the transmitter side, this is accompanied by a switch to the reception mode at the receiver, allowing radar transmission and reception to be commenced.

The above-mentioned radar receiver is preferably configured so that it includes a reception detector that detects a reception of a signal by the antenna. The mode switcher switches from the standby mode to the reception mode when the reception of the signal has been detected.

Thus, when a signal has been received, the receiver switches to the reception mode, allowing radar transmission and reception to be commenced.

In another aspect of the present invention, there is provided a radar device including the above-mentioned radar receiver, the antenna, and a radar transmitter that outputs a transmission signal to the antenna.

BRIEF DESCRIPTION OF THE DRAWINGS

Referring now to the attached drawings which form a part of this original disclosure.

DETAILED DESCRIPTION OF EMBODIMENTS

Figure 1:
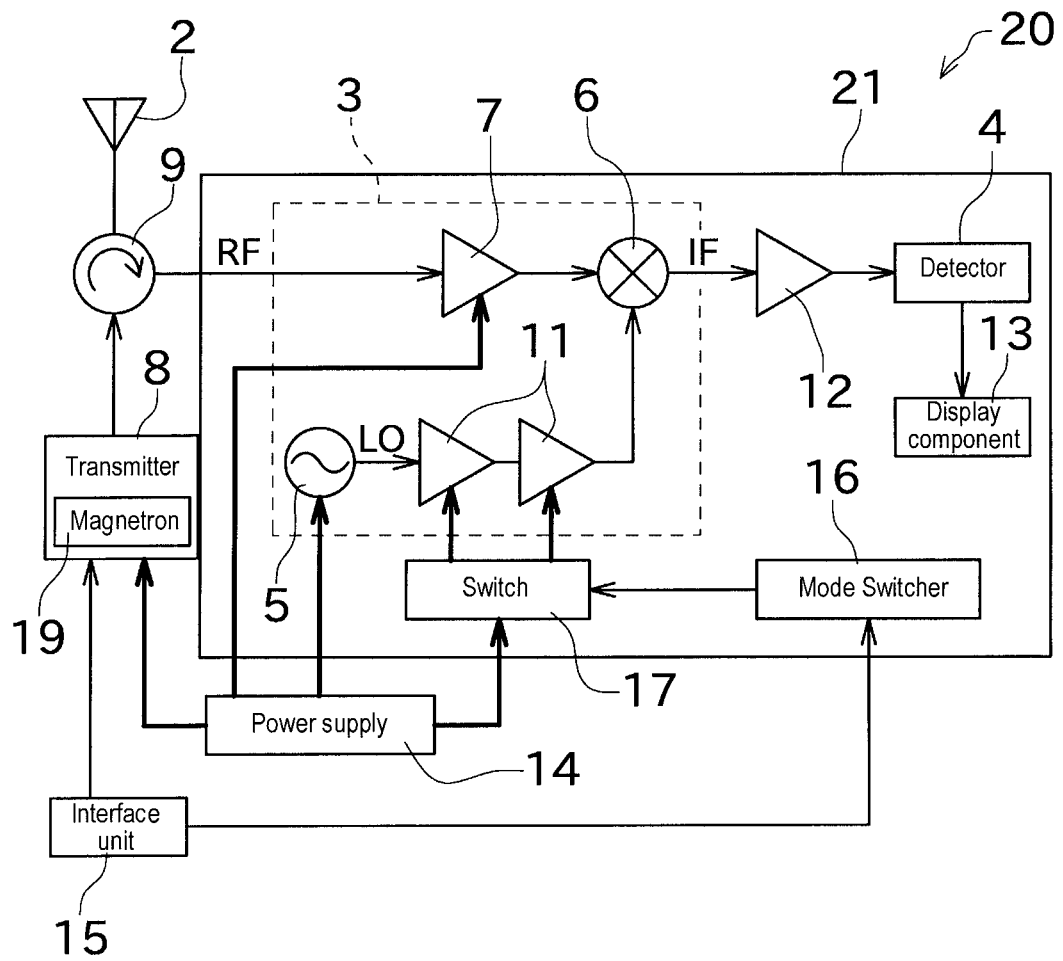
FIG. 1 is a block diagram of the configuration of the radar device pertaining to an embodiment of the present invention.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

An embodiment of the present invention will now be described through reference to the drawings. A radar device 20 in this embodiment (shown in FIG. 1) is a marine-use pulse radar device, and includes a radar antenna 2, a transmitter (radar transmitter) 8, a circulator 9, a receiver (radar receiver) 21, an interface unit 15, and a power supply 14.

The transmitter 8 includes an oscillator formed by a magnetron 19, which produces a high-frequency pulse signal (transmission signal) at a specific period, and applies this signal to the radar antenna 2. Consequently, the pulse signal is emitted from the radar antenna 2. The radar antenna 2 has a known configuration, and rotates at a specific rotational period while repeating the transmission and reception of radio waves.

The circulator 9 is configured so as to suitably switch the path of signals so that pulse signals of high energy from the transmitter 8 will not be inputted to the receiver 21, and so that signals received by the radar antenna 2 will be properly inputted to the receiver 21.

The interface unit 15 includes a plurality of control buttons, for example, and is designed so that the user can perform various operations.

The configuration of the receiver 21 will now be described.

The receiver 21 includes a front end 3, an IF amplifier 12, a detector 4, and a display component 13.

The front end 3 includes a low noise amplifier 7, a mixer 6, a local oscillator 5, and a buffer amplifier 11.

The low noise amplifier 7 amplifies the high-frequency signal (RF signal) received by the radar antenna 2 at a high S/N ratio. The high-frequency signal RF amplified by the low noise amplifier 7 is outputted to the mixer 6.

The local oscillator 5 produces a local oscillation signal (LO signal) and outputs it to the mixer 6. The buffer amplifier 11 is provided between the local oscillator 5 and the mixer 6. This decreases the degree of connection between the local oscillator 5 and the mixer 6, and prevents instability in the frequency of the local oscillation signal. LO due to a frequency entrainment. With the front end 3 in this embodiment, a plurality of stages of the buffer amplifiers 11 is provided.

The mixer 6 mixes the high-frequency signal RF from the low noise amplifier 7 with the local oscillation signal LO from the buffer amplifier 11, thereby producing an intermediate-frequency signal IF (IF signal), and outputs this signal. The intermediate-frequency signal IF is suitably amplified by the IF amplifier 12, after which it is inputted to the detector 4.

The detector 4 detects the intermediate-frequency signal IF and performs sampling to obtain digital waveform data (reception data). This reception data is outputted to the display component 13. The display component 13 is configured so as to produce a radar image by subjecting the reception data to suitable signal processing, and to display this image on a suitable display means (such as a liquid crystal display). A configuration for producing a radar image on the basis of reception data is known, and therefore will not be described in detail here.

The transmitter 8 and the receiver 21 operate upon receiving a supply of electrical power from the power supply 14. Electricity is supplied from a suitable external power supply to the power supply 14. The supply of electricity from the power supply 14 to the transmitter 8 and the receiver 21 can be switched on and off by the user by performing the necessary operation. When the power supply 14 has been switched off (that is, when the power to the radar device 20 has been cut), no electricity is supplied to the transmitter 8 or the receiver 21. Therefore, in this state there is no transmission or reception of signals by the radar device 20. Meanwhile, when the power supply 14 has been switched on (that is, when the power to the radar device 20 is on), electricity is supplied to the transmitter 8 and the receiver 21, allowing the radar device 20 to operate.

Next, the switching of the operating mode of the transmitter 8 will be described. With the radar device 20 in this embodiment, the transmitter 8 can switch between at least two operating modes, namely, a "transmission mode" and a "standby mode."

The transmission mode is a mode in which a pulse signal is outputted from the magnetron 19 of the transmitter 8 and applied to the radar antenna 2. In this mode, pulse signals are sent out from the radar antenna 2, so the transmission of signals at the radar device 20 can be carried out normally.

Meanwhile, the standby mode is a mode in which power is sent only to the magnetron 19 of the transmitter 8, and no pulse signal is outputted. Thus supplying power to the magnetron 19 stabilizes the temperature of the magnetron 19.

The user can operate the interface unit 15 to switch between the transmission mode and the standby mode. For example, the interface unit 15 in this embodiment has a "transmission/standby switching button" (hereinafter referred to simply as a switching button). Every time the user operates the switching button, the interface unit 15 alternately outputs a standby mode switching trigger signal and a transmission mode switching trigger signal. These trigger signals are inputted to the transmitter 8.

When the transmission mode switching trigger signal has been received, the transmitter 8 begins the output of pulse signals from the magnetron 19. This starts the transmission of signals by the radar device 20. That is, the configuration is such that when the user operates the switching button of the interface unit 15 and the transmission mode switching trigger signal is outputted, the operating mode of the transmitter 8 is switched to the "transmission mode."

Meanwhile, when the standby mode switching trigger signal has been received, the transmitter 8 does not output a pulse signal from the magnetron 19, and only sends power to the magnetron 19. That is, the configuration is such that when the user operates the switching button of the interface unit 15 and the standby mode switching trigger signal is outputted, the operating mode of the transmitter 8 is switched to the "standby mode."

When the power is turned on to the radar device 20 (when the power supply 14 goes from its off state to its on state), the standby mode switching trigger signal is automatically outputted. That is, the transmitter 8 of the radar device 20 automatically goes into the standby mode when the power is turned on. Thus moving automatically to the standby mode when the power is turned on allows current to flow to the magnetron 19, so that the magnetron 19 can be preheated.

The radar device 20 in this embodiment is configured such that when the power has been turned on, the expected time until the preheating of the magnetron 19 is complete is displayed as a countdown by a suitable display means. Once the user confirms that the preheating of the magnetron 19 is complete, the user operates the switching button of the interface unit 15 at a specific timing to switch the transmitter 8 to the "transmission mode" and start the transmission of pulse signals.

Also, when the transmitter 8 is in the transmission mode, the user can operate the switching button of the interface unit 15 at the desired timing to switch the transmitter 8 to the "standby mode" and halt the transmission of pulse signals. Here again, since the supply of power to the magnetron 19 continues uninterrupted, the magnetron 19 does not become unstable due to temperature changes. Therefore, the user can operate the switching button of the interface unit 15 again at the desired timing to switch the transmitter 8 back to the "transmission mode" and restart stable transmission right away (without preheating).

The characteristic configuration of the radar device 20 in this embodiment will now be described in detail.

The radar device 20 in this embodiment is configured so that the receiver 21 can switch between at least two operating modes, namely, a "reception mode" and a "standby mode."

The reception mode is a mode in which power is supplied to the various components of the front end 3 (the local oscillator 5, the low noise amplifier 7, the buffer amplifier 11, etc.). In this mode, the front end 3 operates normally, so the reception of signals at the radar device 20 can be carried out normally.

Meanwhile, the standby mode is a mode in which no power is supplied to the buffer amplifier 11 of the front end 3. When power is thus cut off to the buffer amplifier 11, there is no leakage of the local oscillation signal LO from the local oscillator 5 to the mixer 6. Therefore, with this configuration, the leakage of the local oscillation signal LO in the standby mode from the radar antenna 2 via the mixer 6 can be effectively prevented.

Next, the configuration of the receiver 21 in this embodiment will be described in further detail. The receiver 21 in this embodiment includes a mode switcher 16 and a switch 17.

The switch 17 is configured as a transistor switching circuit. The switch 17 is disposed between the power supply 14 and the buffer amplifier 11. This switch 17 allows the supply of power to the buffer amplifier 11 to be switched on and off.

The mode switcher 16 controls the on/off switching of the switch 17, and switches the operating mode of the receiver 21. That is, in the "reception mode" of the receiver 21, the mode switcher 16 turns on the switch 17 and supplies power to the buffer amplifier 11. On the other hand, in the "standby mode" of the receiver 21, the mode switcher 16 turns off the switch 17 and does not supply power to the buffer amplifier 11.

Since the characteristics of the local oscillator 5 and the low noise amplifier 7 can vary with temperature changes, there is the risk that they will become unstable due to temperature changes if the supply of electricity is off. In view of this, the configuration is such that power is always supplied to the local oscillator 5 and the low noise amplifier 7 regardless of the operating mode. Specifically, with the front end 3 in this embodiment, the buffer amplifier 11 is the only component for which the supply of power is switched on and off by the mode switcher 16. Thus, instability caused by temperature changes can be prevented by always supplying power to those components whose characteristics can fluctuate with the temperature, regardless of the operating mode.

The buffer amplifier 11 is used to decrease the degree of connection between the mixer 6 and the local oscillator 5, and is generally not affected much by temperature changes. Therefore, as discussed above, even when the power to the buffer amplifier 11 is switched off, there is no danger that the buffer amplifier 11 will become unstable due to temperature changes.

With the above configuration of this embodiment, when the standby mode has been switched to the reception mode, the various components of the front end 3 (the local oscillator 5, the low noise amplifier 7, the buffer amplifier 11, etc.) will not become unstable due to temperature changes. Therefore, stable reception can begin instantly when the receiver 21 is switched from the standby mode to the reception mode.

Also, the mode switcher 16 is configured so that the switching of the operating mode of the receiver 21 is carried out in conjunction with the switching of the operating mode of the transmitter 8. The above-mentioned trigger signal from the interface unit 15 is inputted to the mode switcher 16 to link to the switching of the operating mode of the transmitter 8. The mode switcher 16 is configured so as to switch the switch 17 on and off according to this trigger signal.

This will now be described in more specific terms. The configuration is such that when the transmission mode switching trigger signal has been received (when the user performs an operation to start transmission by the transmitter 8), the mode switcher 16 turns on the switch 17 so that power is supplied to the buffer amplifier 11. That is, the configuration is such that the receiver 21 is also switched to the "reception mode" in conjunction with the switching of the transmitter 8 to the "transmission mode." This allows signals to be received normally by the receiver 21 when the transmitter 8 transmits pulse signals.

Meanwhile, the configuration is such that when the standby mode switching trigger signal has been received (when the user performs an operation to interrupt the transmission by the transmitter 8), the mode switcher 16 turns off the switch 17 so that power is not supplied to the buffer amplifier 11. That is, the configuration is such that the receiver 21 is also switched to the "standby mode" in conjunction with the switching of the transmitter 8 to the "standby mode." As discussed above, the standby mode switching trigger signal is automatically outputted when the power is switched on to the radar device 20, so the receiver 21 automatically goes into the standby mode when the power is turned on.

As described above, the receiver 21 in this embodiment includes the local oscillator 5, the mixer 6, the buffer amplifier 11, and the mode switcher 16. The local oscillator 5 outputs the local oscillation signal LO. The mixer 6 mixes the local oscillation signal LO with the high-frequency signal RF received by the radar antenna 2. The buffer amplifier 11 is disposed between the local oscillator 5 and the mixer 6. The mode switcher 16 switches at least between a standby mode in which power is supplied to the local oscillator 5 and no power is supplied to the buffer amplifier 11 and a reception mode in which power is supplied to both the local oscillator 5 and the buffer amplifier 11.

Thus switching off the buffer amplifier 11 located between the local oscillator 5 and the mixer 6 effectively prevents the local oscillation signal LO from leaking out through the mixer 6 in the standby mode. Also, since the power to the local oscillator 5 is left on even in the standby mode, the local oscillator 5 is prevented from becoming unstable due to temperature changes. Furthermore, the buffer amplifier 11 is used to decrease the degree of connection between the mixer 6 and the local oscillator 5, and is generally not affected much by temperature changes. Therefore, as discussed above, even when the power to the buffer amplifier 11 is switched off, there is no danger that the buffer amplifier 11 will become unstable.

As mentioned above, the receiver 21 in this embodiment has a simple configuration for switching the power supply of the buffer amplifier 11 on and off, which realizes the distinctive effect of effectively preventing leakage of the local oscillation signal LO from the radar antenna 2 in the standby mode, and of allowing stable reception to begin at the moment when the operating mode is switched from the standby mode to the reception mode.

A modification example of the above embodiment will be described through reference to FIG. 2. In the description of this modification example, those members that are the same as or similar to those in the above embodiment will be numbered the same and will not be described again.

The receiver 21 in the above embodiment is configured so that the operating mode of the receiver 21 is switched in response to the trigger signal from the interface unit 15. Instead, the receiver 31 in the modification example shown in FIG. 2 is configured so that the operating mode is switched according to whether or not a signal has been received by the radar antenna 2.

This will now be described in more specific terms. The receiver 31 in this modification example has a reception detector 33 that detects a high-frequency signal RF, and that is provided at a stage in front of the mixer 6. The detection result of the reception detector 33 is outputted to a mode switcher 32.

The mode switcher 32 is configured such that when the high-frequency signal RF has been detected by the reception detector 33, the switch 17 is turned on and power is supplied to the buffer amplifier 11. Specifically, if the high-frequency signal RF has been detected by the reception detector 33, it can be concluded that the transmitter 8 has sent a pulse signal in a "transmission mode," so the receiver 31 is also switched to a "reception mode" and performs signal reception.

Meanwhile, the mode switcher 32 is configured such that once a specific length of time has elapsed since the point when the high-frequency signal RF was no longer detected by the reception detector 33, the switch 17 is switched off so that no power is supplied to the buffer amplifier 11. Specifically, once a specific length of time has elapsed since the point when the high-frequency signal RF was no longer detected by the reception detector 33, it can be concluded that the transmitter 8 is in the "standby mode" (no pulse signals are being transmitted), so the receiver 31 also goes into the "standby mode."

With this configuration, even though no trigger signal from the interface unit 15 is acquired on the receiver 31 side, the operating mode of the receiver 31 can be switched in conjunction with the operating mode of the transmitter 8.

A preferred embodiment of the present invention is described above, but the above configuration can be modified as follows.

In the above embodiment, the oscillator of the transmitter 8 is a magnetron, but the constitution of the present invention can also be applied to a radar device that transmits signals with some other kind of oscillator.

The configurations of the power supply 14, the switch 17, and the mode switcher 16 are just an example, and are not limited to what is given above. As long as the supply of power to the buffer amplifier 11 can be turned on and off, some other configuration can be employed.

Figure 2:
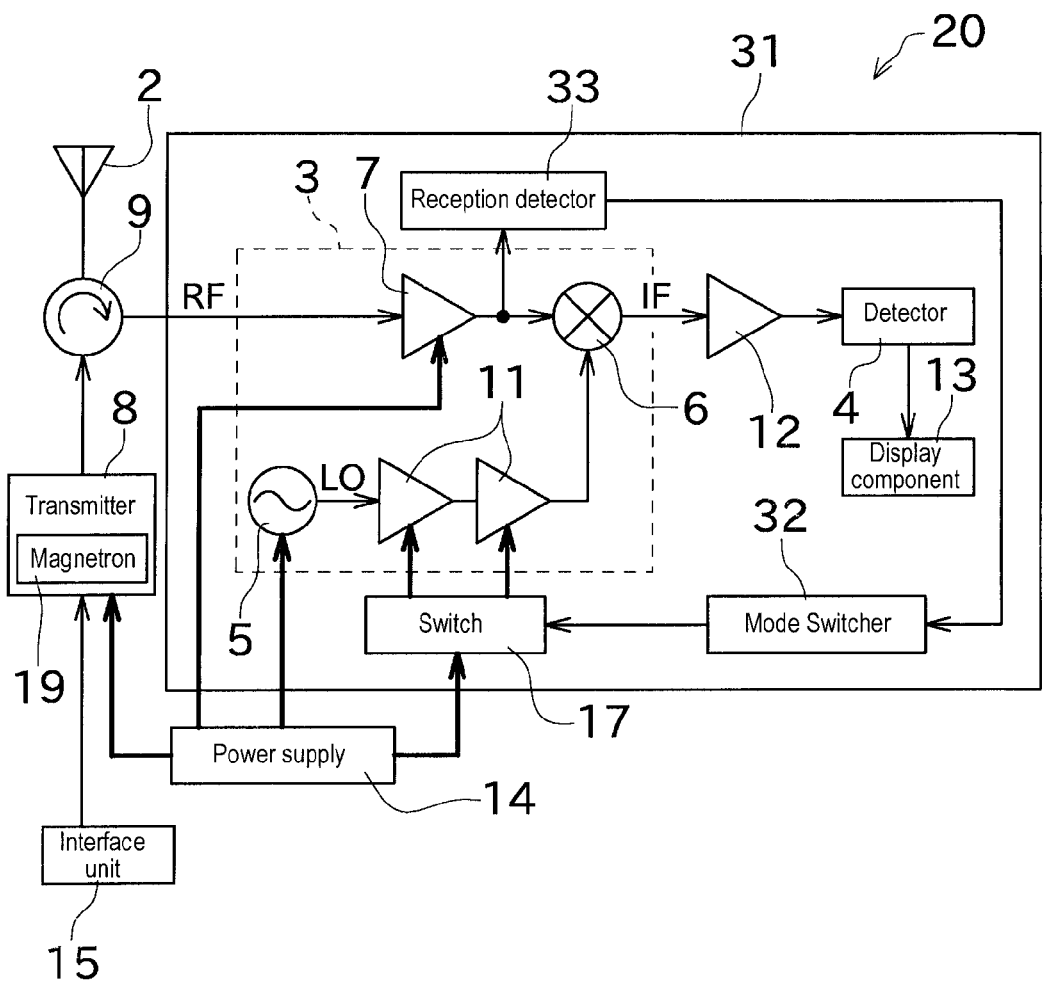
FIG. 2 is a block diagram of the configuration of the radar device pertaining to a modification example.
Figure 3:
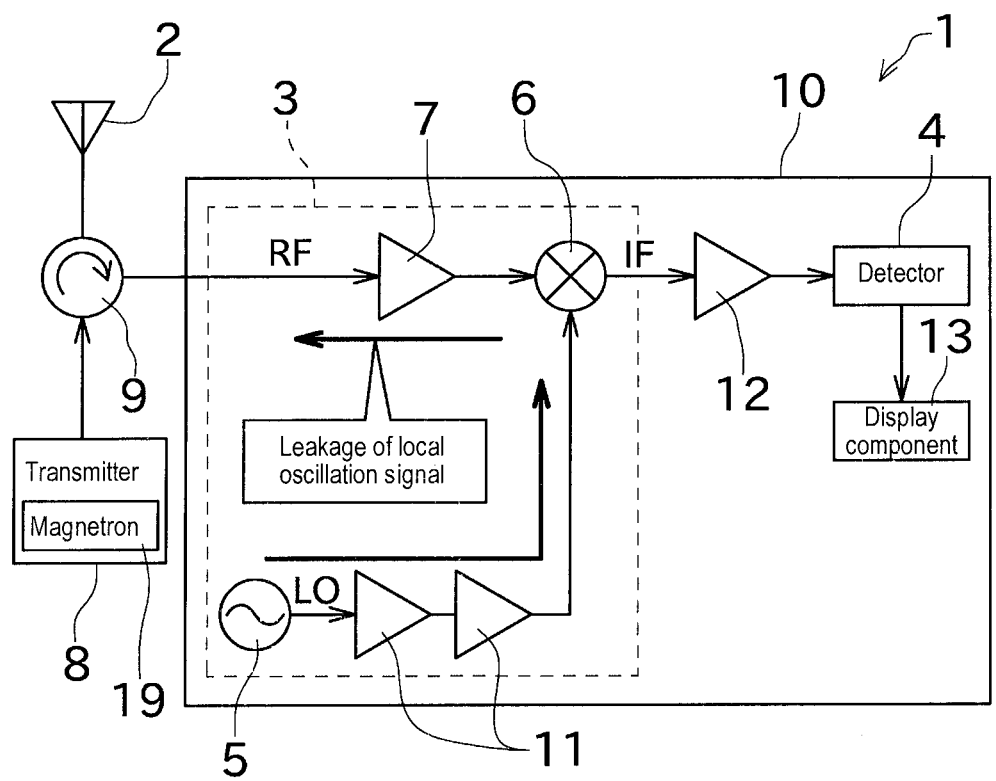
FIG. 3 is a block diagram of the configuration of a conventional radar device.

In FIGS. 1 and 2, the supply of electricity to a plurality of stages of the buffer amplifier 11 is controlled by the switch 17, but all that is necessary is for the supply of electricity to at least one of the buffer amplifiers 11 to be turned on and off. The buffer amplifier 11 does not actually have to be multi-stage, and can be just a single stage.

The configuration of the radar device shown in the drawings is just an example, and it should go without saying that an amplifier, filter, or the like can be suitably added as needed.

In the above embodiment, a radar device including a transmitter and a receiver is described, but the constitution of the present invention can also be applied to an independent radar receiver that does not include a transmitter. Also, the constitution of the present invention can be applied to a radar device used for some other application, rather than a marine radar device.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A radar receiver comprising:
   a local oscillator configured to output a local oscillation signal;
   a mixer configured to mix a high-frequency signal received by an antenna with the local oscillation signal;
   a buffer amplifier disposed between the local oscillator and the mixer; and
   a mode switcher configured to switch at least between a standby mode in which power is supplied to the local oscillator and no power is supplied to the buffer amplifier and a reception mode in which power is supplied to both the local oscillator and the buffer amplifier.

2. The radar receiver according to claim 1, further comprising
   a low noise amplifier configured to amplify the high-frequency signal received by the antenna, and configured to output the result to the mixer,
   the mode switcher being further configured to supply power to the low noise amplifier in both the standby mode and the reception mode.

3. The radar receiver according to claim 1, wherein
   the mode switcher is further configured to acquire a trigger signal outputted when an operation is performed to start transmission by a radar transmitter, and to switch from the standby mode to the reception mode when the trigger signal has been acquired.

4. The radar receiver according to claim 1, further comprising
   a reception detector configured to detect a reception of a signal by the antenna,
   the mode switcher being further configured to switch from the standby mode to the reception mode when the reception of the signal has been detected.

5. A radar device comprising:
   the radar receiver according to claim 1;
   the antenna; and
   a radar transmitter configured to output a transmission signal to the antenna.

\* \* \* \* \*